United States Patent
Huang et al.

(10) Patent No.: US 10,680,222 B2
(45) Date of Patent: Jun. 9, 2020

(54) METHOD OF MAKING THERMALLY-STABLE COMPOSITE SEPARATORS FOR LITHIUM BATTERIES

(71) Applicant: GM GLOBAL TECHNOLOGY OPERATIONS LLC, Detroit, MI (US)

(72) Inventors: Xiaosong Huang, Novi, MI (US); Hamid G. Kia, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 208 days.

(21) Appl. No.: 15/847,358

(22) Filed: Dec. 19, 2017

(65) Prior Publication Data

US 2019/0189985 A1    Jun. 20, 2019

(51) Int. Cl.
*H01M 2/16*    (2006.01)
*H01M 2/14*    (2006.01)
(Continued)

(52) U.S. Cl.
CPC ........... *H01M 2/166* (2013.01); *H01M 2/145* (2013.01); *H01M 2/162* (2013.01);
(Continued)

(58) Field of Classification Search
CPC ..... H01M 2/145; H01M 2/166; H01M 2/1686
(Continued)

(56) References Cited

U.S. PATENT DOCUMENTS

| | | | |
|---|---|---|---|
| 3,916,823 A | 11/1975 | Halloran | |
| 4,068,387 A | 1/1978 | Manos | |

(Continued)

FOREIGN PATENT DOCUMENTS

| | | | |
|---|---|---|---|
| CN | 1638850 A | 7/2005 | |
| CN | 102820445 A | 12/2012 | |

(Continued)

OTHER PUBLICATIONS

Xiaosong Huang; U.S. Appl. No. 15/253,052, filed Aug. 31, 2016 entitled "Methods of Making Separators for Lithium Ion Batteries"; 46 pages.

(Continued)

*Primary Examiner* — James M Erwin
(74) *Attorney, Agent, or Firm* — Harness, Dickey & Pierce, P.L.C.

(57) ABSTRACT

A thermally-stable composite separator for an electrochemical cell that cycles lithium ions is provided, along with methods of making the composite separator. The method includes contacting one or more surface regions of a coated substrate with a coagulant. The coated substrate includes an insulating porous substrate and at least one non-porous polymeric layer including a polymer, one or more nanoparticles, one or more sub-micron particles, and a solvent. Contacting the coated substrate with the coagulant medium removes the solvent causing the polymer to precipitate forming at least one substantially uniform porous polymer layer in place of the at least one non-porous polymeric layer. The coagulant medium has a viscosity greater than that of the solvent and a solubility parameter distance between the polymer and the coagulant medium is less than that between the polymer and water.

15 Claims, 4 Drawing Sheets

(51) Int. Cl.
*H01M 10/0525* (2010.01)
*H01M 10/42* (2006.01)

(52) U.S. Cl.
CPC ....... *H01M 2/1613* (2013.01); *H01M 2/1646* (2013.01); *H01M 2/1686* (2013.01); *H01M 10/0525* (2013.01); *H01M 10/4235* (2013.01); *H01M 2220/20* (2013.01)

(58) Field of Classification Search
USPC ........................................... 429/251
See application file for complete search history.

(56) References Cited

U.S. PATENT DOCUMENTS

| | | |
|---|---|---|
| 6,261,722 B1 | 7/2001 | Dasgupta et al. |
| 6,432,586 B1 | 8/2002 | Zhang |
| 6,444,356 B1 | 9/2002 | Ma et al. |
| 6,511,774 B1 | 1/2003 | Tsukuda et al. |
| 6,830,846 B2 | 12/2004 | Kramlich et al. |
| 7,018,607 B2 | 3/2006 | Nazri et al. |
| 7,592,195 B2 | 9/2009 | Rogalla et al. |
| 7,595,130 B2 | 9/2009 | Kawabata et al. |
| 7,691,529 B2 | 4/2010 | Hennige et al. |
| 7,722,994 B2 | 5/2010 | Halalay |
| 7,794,511 B2 | 9/2010 | Wensley et al. |
| 7,879,395 B2 | 2/2011 | Klipp et al. |
| 8,337,974 B2 | 12/2012 | Hennige et al. |
| 8,460,591 B2 | 6/2013 | Huang et al. |
| 8,460,829 B1 | 6/2013 | Huang et al. |
| 8,470,468 B2 | 6/2013 | Xiao et al. |
| 8,470,898 B2 | 6/2013 | Huang |
| 8,592,042 B2 | 11/2013 | Blohowiak et al. |
| 8,592,088 B2 | 11/2013 | Kim |
| 8,765,301 B2 | 7/2014 | Halalay et al. |
| 8,835,058 B2 | 9/2014 | Kia et al. |
| 8,951,654 B2 | 2/2015 | Sachdev et al. |
| 8,993,646 B2 | 3/2015 | Huang |
| 9,028,565 B2 | 5/2015 | Huang |
| 9,088,120 B2 | 7/2015 | Lev et al. |
| 9,138,932 B2 | 9/2015 | Huang |
| 9,172,075 B2 | 10/2015 | Kia et al. |
| 9,287,540 B2 | 3/2016 | Huang |
| 9,324,984 B2 | 4/2016 | Huang et al. |
| 9,333,588 B2 | 5/2016 | Carlson et al. |
| 9,346,066 B2 | 5/2016 | Huang |
| 9,406,971 B2 | 8/2016 | Kia et al. |
| 10,056,590 B2 | 8/2018 | Huang et al. |
| 2002/0122986 A1 | 9/2002 | Labarge et al. |
| 2003/0099878 A1 | 5/2003 | Kramlich et al. |
| 2003/0148024 A1 | 8/2003 | Kodas et al. |
| 2004/0081886 A1 | 4/2004 | Zuckerbrod et al. |
| 2005/0070193 A1 | 3/2005 | Hennige et al. |
| 2005/0155411 A1 | 7/2005 | Rogalla et al. |
| 2007/0134548 A1 | 6/2007 | Wensley et al. |
| 2008/0090101 A1 | 4/2008 | Klipp et al. |
| 2008/0111027 A1 | 5/2008 | Blohowiak et al. |
| 2008/0220327 A1 | 9/2008 | Kim |
| 2008/0241699 A1 | 10/2008 | Halalay |
| 2009/0311418 A1 | 12/2009 | Hennige et al. |
| 2011/0129731 A1 | 6/2011 | Wakizaka et al. |
| 2011/0135987 A1 | 6/2011 | Shin |
| 2011/0236762 A1 | 9/2011 | Huang et al. |
| 2012/0102725 A1 | 5/2012 | Fuller et al. |
| 2012/0156568 A1 | 6/2012 | Kia et al. |
| 2012/0156569 A1 | 6/2012 | Kia et al. |
| 2012/0193331 A1 | 8/2012 | Carlson et al. |
| 2012/0231321 A1 | 9/2012 | Huang et al. |
| 2012/0315384 A1 | 12/2012 | Abd Elhamid et al. |
| 2013/0004857 A1 | 1/2013 | Kia et al. |
| 2013/0005196 A1 | 1/2013 | Lev et al. |
| 2013/0052509 A1 | 2/2013 | Halalay et al. |
| 2013/0143076 A1 | 6/2013 | Sachdev et al. |
| 2013/0236766 A1 | 9/2013 | Seo et al. |
| 2013/0337336 A1* | 12/2013 | Yano .................... B29C 39/006 429/246 |
| 2014/0038024 A1 | 2/2014 | Huang |
| 2014/0242452 A1 | 8/2014 | Pieczonka et al. |
| 2014/0272526 A1 | 9/2014 | Huang |
| 2015/0380707 A1* | 12/2015 | Iwai .................... H01M 2/1653 429/145 |

FOREIGN PATENT DOCUMENTS

| | | |
|---|---|---|
| CN | 109935758 A | 6/2019 |
| DE | 102012209381 A1 | 12/2012 |
| DE | 102018132553 A1 | 6/2019 |
| WO | WO-1995/016060 A1 | 6/1995 |
| WO | WO-2012/060604 A2 | 5/2012 |

OTHER PUBLICATIONS

Wypych, "Knovel Solvents—A Properties Database", 2008; 2012; p. 1.

Pankaj Arora and Zhengming (John) Zhang, Battery Separators, Chem. Rev. 2004, 104, 4419-4462.

First Office Action for Chinese Patent Application No. 201210185917.4 dated Mar. 5, 2014, 10 pages.

Second Office Action for Chinese Patent Application No. 201210185917.4 dated Oct. 27, 2014, 6 pages.

Summary of Interview with Chinese Examiner of the Patent Office of the People's Republic of China dated Mar. 16, 2015 for Chinese Patent Application No. 201210185917.4, summary/translation provided by China Patent Agent (H.K.) Ltd.

* cited by examiner

METHOD OF MAKING THERMALLY-STABLE COMPOSITE SEPARATORS FOR LITHIUM BATTERIES

INTRODUCTION

This section provides background information related to the present disclosure which is not necessarily prior art.

The present disclosure relates to methods of making thermally-stable composite separators for electrochemical cells. The methods include contacting one or more surface regions of an insulating porous substrate having at least one non-porous coating with a coagulant medium to form at least one substantially uniform porous polymer coating on the insulating porous substrate. The present disclosure also relates to thermally-stable composite separators made from such processes.

By way of background, high-energy density, electrochemical cells, such as lithium-ion batteries and lithium-sulfur batteries can be used in a variety of consumer products and vehicles, such as Hybrid Electric Vehicles (HEVs) and Electric Vehicles (EVs). Typical lithium-ion and lithium-sulfur batteries comprise a first electrode, a second electrode, an electrolyte material, and a separator. One electrode serves as a positive electrode or cathode and the other serves as a negative electrode or anode. Often a stack of lithium-ion battery cells are electrically connected to increase overall output. Conventional rechargeable lithium-ion and lithium-sulfur batteries operate by reversibly passing lithium ions back and forth between the negative electrode and the positive electrode. An electrically insulating separator and an electrolyte are disposed between the negative and positive electrodes. The electrolyte is suitable for conducting lithium-ions and may be in solid (e.g., solid state diffusion) or liquid form. Lithium-ions move from a cathode (positive electrode) to an anode (negative electrode) during charging of the battery, and in the opposite direction when discharging the battery.

Many different materials may be used to create components for a lithium-ion battery. By way of non-limiting example, cathode materials for lithium-ion batteries typically comprise an electroactive material which can be intercalated or alloyed with lithium ions, such as lithium-transition metal oxides or mixed oxides of the spinel type, for example including spinel $LiMn_2O_4$, $LiCoO_2$, $LiNiO_2$, $LiMn_{1.5}Ni_{0.5}O_4$, $LiNi_{(1-x-y)}Co_xM_yO_2$ (where 0<x<1, y<1, and M may be Al, Mn, or the like), or lithium iron phosphates. The electrolyte typically contains one or more lithium salts, which may be dissolved and ionized in a non-aqueous solvent. Common negative electrode materials include lithium insertion materials or alloy host materials, like carbon-based materials, such as lithium-graphite intercalation compounds, or lithium-silicon compounds, lithium-tin alloys, and lithium titanate $Li_{4+x}Ti_5O_{12}$, where $0 \leq x \leq 3$, such as $Li_4Ti_5O_{12}$ (LTO). The negative electrode may also be made of a lithium-containing material, such as metallic lithium, so that the electrochemical cell is considered a lithium metal battery or cell.

Separators can be made using wet or dry processes to form insulating barriers having adequate porosity to enable ions to move between the first and second electrodes. The process used to create pores in conventional lithium ion battery separators generally requires precise stretching of an extruded thin film. However, such a process may be timely and costly and the formed separators may be susceptible to heat shrinkage increasing the potential risk of battery shorting. Accordingly, it would be desirable to develop a separator that may be formed at an increased production rate from materials having improved pore uniformity and good thermal stability.

SUMMARY

This section provides a general summary of the disclosure, and is not a comprehensive disclosure of its full scope or all of its features.

In various aspects, the present disclosure provides a method of forming a thermally-stable composite separator for an electrochemical cell that cycles lithium ions. The method may include contacting one or more coated surface regions of a porous insulating substrate with a coagulant medium. The one or more coated surface regions may have at least one non-porous polymeric layer. The at least one non-porous polymeric layer may include a polymer, one or more particulate additives, and a solvent. The contacting of the one or more coated surface regions of the insulating substrate with the coagulant medium may remove the solvent of the at least one non-porous polymeric layer so to cause precipitation of the polymer and formation of at least one substantially uniform porous polymer layer on the one or more coated surface regions of the porous insulating substrate resulting in a thermally-stable composite separator. The coagulant medium may have a first viscosity (Pa·s) greater than a second viscosity (Pa·s) of the solvent. Further, a solubility parameter distance between the polymer and the coagulant medium may be less than that a solubility parameter distance between the polymer and water. The formed thermally-stable composite separate may be washed to remove residual primary solvent and coagulant medium and subsequently dried.

In one aspect, the one or more particulate additives may be selected from one or more nanoparticles having an average diameter of less than 100 nm; one or more sub-micron particles having an average diameter of greater than or equal to about 100 nm and less than or equal to about 2 μm; and combinations thereof.

In one aspect, the polymer may include at least 200 repeating units and may be selected from the group consisting of: aramid fibers, polyamide, polyvinylidene fluoride (PVdF), polysulfide, polyimide (PI), polyacrylic, polycarbonate, and combinations thereof; the one or more nanoparticles and the one or more sub-micron particles may include materials independently selected from the group consisting of: alumina ($Al_2O_3$), silica ($SiO_2$), titanium dioxide ($TiO_2$), calcium chloride ($CaCl_2$), metal oxides, carboxides, nitrides, titanates, clays, phosphates, and combinations thereof; and the solvent may be selected from the group consisting of N-methyl-2-pyrrolidone (NMP), dimethylformamide (DMF), dimethyl sulfoxide (DMSO), dimethylacetamide (DMAc), and combinations thereof.

In one aspect, the solvent may include greater than or equal to about 2 wt. % to less than or equal to about 20 wt. % of one or more of calcium chloride ($CaCl_2$) and lithium chloride (LiCl) dissolved in N-methyl-2-pyrrolidone (NMP).

In one aspect, the at least one non-porous polymeric layer may be formed using a polymer coating solution having a third viscosity greater than or equal to about 1 Pa·s and less than or equal to about 80 Pa·s; and the at least one non-porous polymeric layer may be formed by applying the polymer coating solution via a deposition process to the one or more surface regions of the porous insulating substrate.

In one aspect, the at least one non-porous polymeric layer may have a fourth viscosity greater than or equal to about 0.1

Pa·s and less than or equal to about 20 Pa·s; and the coated porous insulated substrate may be formed by first disposing the at least one non-porous polymeric layer onto a conveying system and subsequently contacting the insulating porous substrate with the at least one solid polymeric layer.

In one aspect, the solvent may be a primary solvent and the viscosity of a polymer coating solution used to form the at least one non-porous polymeric layer may be varied by adding a secondary volatile solvent; and the secondary volatile solvent may be selected from the group consisting of: tetrahydrofuran (THF), acetone, acetonitrile, and combinations thereof.

In one aspect, the at least one non-porous polymeric layer may be applied with a polymer coating solution comprising greater than or equal to about 3 wt. % to less than or equal to about 40 wt. % of the polymer.

In one aspect, the insulating porous substrate may be selected from the group consisting of: polyethylene (PET) fibers, cellulose fibers, glass fibers, polyolefin fibers, polyamide fibers, and combinations thereof.

In one aspect, the insulating porous substrate may be selected from the group consisting of: polyethylene porous membranes, polypropylene porous membranes, and combinations thereof.

In one aspect, the coagulant medium may comprise materials selected from the group consisting of: ethylene glycol, glycerol, diethylene glycol, and combinations thereof.

In one aspect, the coagulant medium may have a viscosity that is greater than or equal to about 200% that of the primary solvent and the solubility parameter distance between the polymer and the coagulant may be less than or equal to half of the solubility parameter distance between the polymer and water.

In another variation, the present disclosure provides a further method of forming a thermally-stable composite separator for an electrochemical cell that cycles lithium ions. The method may include applying at least one non-porous polymeric layer via a deposition process to one or more surface regions of an insulating porous substrate and contacting the at least one non-porous polymeric layer with a coagulant medium. The at least one non-porous polymeric layer may include a polymer, one or more nanoparticles having an average diameter of less than 100 nm, one or more sub-micron particles having an average diameter of greater than or equal to about 100 nm and less than or equal to about 2 μm, and a solvent having a viscosity greater than or equal to about 1 Pa·s and less than or equal to about 80 Pa·s. The contacting with the coagulant medium may remove the primary solvent so to cause the polymer to precipitate to form at least one substantially uniform porous polymer layer on the porous substrate in place of the at least one non-porous polymeric layer. The coagulant medium may have a viscosity that is greater than or equal to about 200% that of the primary solvent, and a solubility parameter distance between the polymer and the coagulant may be less than or equal to half of a solubility parameter distance between the polymer and water.

In one aspect, the polymer may be selected from the group consisting of: aramid fibers, polyamide, polyvinylidene fluoride (PVdF), polysulfide, polyimide (PI), polyacrylic, polycarbonate, and combinations thereof; the one or more nanoparticles and the one or more sub-micron particles may include materials independently selected from the group consisting of: alumina ($Al_2O_3$), silica ($SiO_2$), titanium dioxide ($TiO_2$), calcium chloride ($CaCl_2$), metal oxides, carboxides, nitrides, titanates, clays, phosphates, and combinations thereof; and the solvent may be selected from the group consisting of N-methyl-2-pyrrolidone (NMP), dimethylformamide (DMF), dimethyl sulfoxide (DMSO), dimethylacetamide (DMAc), and combinations thereof.

In one aspect, the coagulant may be selected from the group consisting of: ethylene glycol, glycerol, diethylene glycol, and combinations thereof.

In yet another variation, the present disclosure provides a thermally-stable separator for an electrochemical cell that cycles lithium ions. The separator may be in a sheet form and may include a substantially uniform porous polymer layer having a porosity greater than or equal to about 20% to less than or equal to about 90%. The substantially uniform pores of the substantially uniform porous polymer layer may have an average diameter of less than or equal to about 2 μm and may include a polymer, one or more nanoparticles having an average diameter of less than 100 nm, and one or more sub-micron particles having an average diameter of greater than or equal to about 100 nm and less than or equal to about 2 μm.

In one aspect, the polymer coating solution may include greater than or equal to about 3 wt. % to less than or equal to about 40 wt. % of the polymer, and the polymer may be selected from the group consisting of: aramid fibers, polyamide, polyvinylidene fluoride (PVdF), polysulfide, polyimide (PI), polyacrylic, polycarbonate, and combinations thereof.

In one aspect, the one or more nanoparticles and the one or more sub-micron particles of the polymer coating solution may include materials independently selected from the group consisting of: alumina ($Al_2O_3$), silica ($SiO_2$), titanium dioxide ($TiO_2$), calcium chloride ($CaCl_2$), metal oxides, carboxides, nitrides, titanates, clays, phosphates, and combinations thereof.

In one aspect, the substantially uniform porous polymer layer may be formed from a polymer coating solution comprising the polymer, the one or more nanoparticles, the one or more sub-micron particles, a solvent, and a coagulant medium having a viscosity that is greater than or equal to about 200% that of the primary solvent. The solvent may be selected from the group consisting of N-methyl-2-pyrrolidone (NMP), dimethylformamide (DMF), dimethyl sulfoxide (DMSO), dimethylacetamide (DMAc), and combinations thereof; and the coagulant may be selected from the group consisting of: ethylene glycol, glycerol, diethylene glycol, and combinations thereof.

In one aspect, the separator further includes an insulating porous substrate layer that is substantially parallel with the substantially uniform porous polymer layer.

In one variation, the substantially uniform porous polymer layer may have a thickness greater than or equal to about 1 μm to less than or equal to about 40 μm and the insulating porous substrate layer may have a less than or equal to about 25 nm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
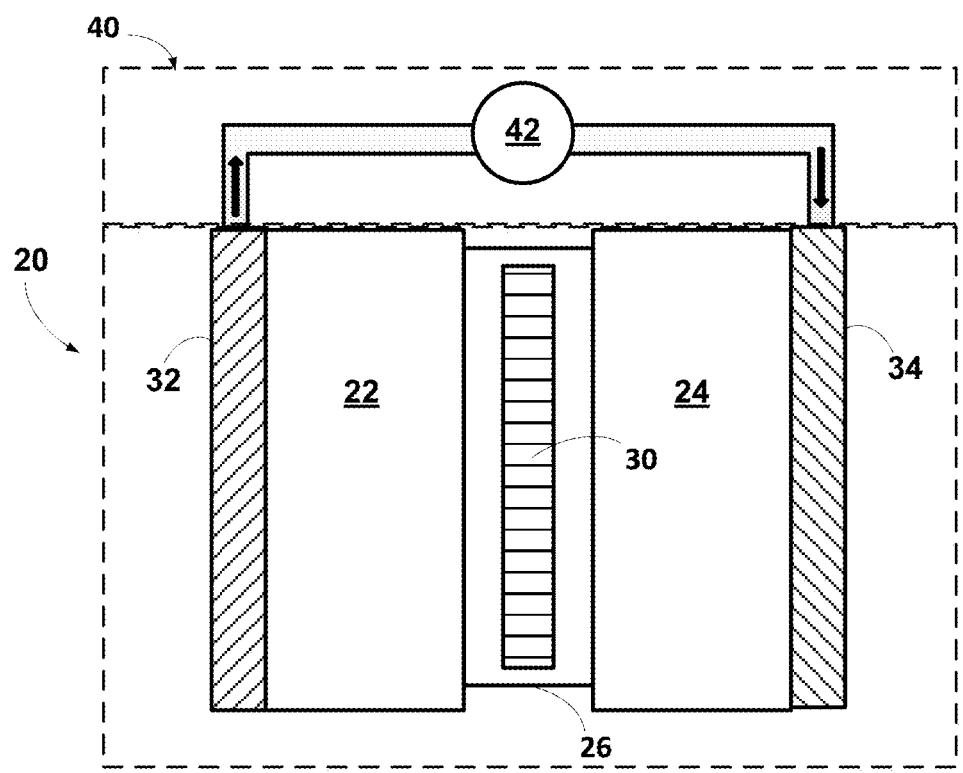
FIG. 1 is a schematic of an exemplary electrochemical battery cell including a composite separator.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to improved electrochemical cells, especially lithium-ion or more particularly lithium-metal batteries, which may be used in vehicle applications. However, the present technology may also be used in other electrochemical devices; especially those that comprise lithium, such as lithium-sulfur batteries. Thus, the discussion of a lithium-ion battery herein is non-limiting.

An exemplary and schematic illustration of a battery 20 that cycles lithium ions is shown in FIG. 1. Battery 20 includes a negative electrode 22, a positive electrode 24, and a porous separator 26 disposed between the two electrodes 22, 24. The porous separator 26 includes an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34).

The porous separator 26 operates as both an electrical insulator and a mechanical support, by being sandwiched between the negative electrode 22 and the positive electrode 24 to prevent physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the battery 20. While in lithium-ion batteries, lithium intercalates and/or alloys in the electrode active materials, in a lithium sulfur battery, instead of intercalating or alloying, the lithium dissolves from the negative electrode and migrates to the positive electrode where it reacts/plates during discharge, while during charging, lithium plates on the negative electrode.

The battery 20 can be charged or re-energized at any time by connecting an external power source to the battery 20 to reverse the electrochemical reactions that occur during battery discharge. The connection of an external power source to the battery 20 compels the production of electrons and release of lithium ions from the positive electrode 25. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the battery 20 may vary depending on the size, construction, and particular end-use of the battery 20. Some notable and exemplary external power sources include, but are not limited to, an AC wall outlet and a motor vehicle alternator. In many lithium-ion battery configurations, each of the negative current collector 32, negative electrode 22, the separator 26, positive electrode 24, and positive current collector 34 are prepared as relatively thin layers (for example, from several microns to a millimeter or less in thickness) and assembled in layers connected in electrical parallel arrangement to provide a suitable electrical energy and power package.

Furthermore, the battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the battery 20 may vary depending on the particular application for which it is designed. Battery-powered vehicles and handheld consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy. In certain other variations, the electrochemical cell may be a supercapacitor, such as a lithium-ion based supercapacitor.

With renewed reference to FIG. 1, the positive electrode 24 may be formed from a lithium-based active material that can sufficiently undergo lithium intercalation and deintercalation, alloying and dealloying, or plating and stripping, while functioning as the positive terminal of the battery 20. The positive electrode 24 electroactive materials may include one or more transition metals, such as manganese (Mn), nickel (Ni), cobalt (Co), chromium (Cr), iron (Fe), vanadium (V), and combinations thereof. Two exemplary common classes of known electroactive materials that can be used to form the positive electrode 24 are lithium transition metal oxides with layered structure and lithium transition metal oxides with spinel phase.

For example, in certain instances, the positive electrode 24 may include a spinel-type transition metal oxide, like lithium manganese oxide ($Li_{(1+x)}Mn_{(2-x)}O_4$), where x is typically less than 0.15, including $LiMn_2O_4$ (LMO) and lithium manganese nickel oxide $LiMn_{1.5}Ni_{0.5}O_4$(LMNO). In other instances, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0<x<1$, $0<y<1$, $0<z<1$, and $x+y+z=1$, including $LiMn_{0.33}Ni_{0.33}Co_{0.33}O_2$; a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate ($LiFePO_4$) or lithium iron fluorophosphate ($Li_2FePO_4F$) can also be used. In certain aspects, the positive electrode 24 may include an electroactive material that includes manganese, such lithium manganese oxide ($Li_{(1+x)}Mn_{(2-x)}O_4$), a mixed lithium manganese nickel oxide ($LiMn_{(2-x)}Ni_xO_4$), where $0<x<1$, and/or a lithium manganese nickel cobalt oxide (e.g., $LiMn_{1/3}Ni_{1/3}Co_{1/3}O_2$). In a lithium-sulfur battery, positive electrodes may have elemental sulfur as the active material or a sulfur-containing active material.

In certain variations, the positive active materials may be intermingled with an optional electrically conductive material and at least one polymeric binder material to structurally fortify the lithium-based active material along with an optional electrically conductive particle distributed therein. For example, the active materials and optional conductive materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), lithium polyacrylate (LiPAA), sodium polyacrylate (NaPAA), sodium alginate, lithium alginate. Electrically conductive materials may include graphite, carbon-based materials, powdered nickel, metal particles, or a conductive polymer. Carbon-based materials may include by way of non-limiting example particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The positive current collector 34 may be formed from aluminum (Al) or any other appropriate electrically conductive material known to those of skill in the art.

In various aspects, the negative electrode 22 includes an electroactive material as a lithium host material capable of functioning as a negative terminal of a lithium-ion battery. In certain aspects, the electroactive material comprises lithium and may be lithium metal. The negative electrode 22 may thus include the electroactive lithium host material and optionally another electrically conductive material, as well as one or more polymeric binder materials to structurally hold the lithium host material together. For example, in certain instances, the negative electrode 22 may include an active material including graphite, silicon (Si), tin (Sn), or other negative electrode particles intermingled with a binder material selected from the group consisting of: polyvinylidene difluoride (PVDF), ethylene propylene diene monomer (EPDM) rubber, or carboxymethyl cellulose (CMC), a nitrile butadiene rubber (NBR), lithium polyacrylate (LiPAA), sodium polyacrylate (NaPAA), sodium alginate, lithium alginate, polyimide, and combinations thereof, by way of non-limiting example. Suitable additional electrically conductive materials may include carbon-based material or a conductive polymer. Carbon-based materials may include by way of non-limiting example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used.

Graphite is often used to form the negative electrode 22 because it exhibits advantageous lithium intercalation and deintercalation characteristics, is relatively non-reactive in the electrochemical cell environment, and can store lithium in quantities that provide a relatively high energy density. Commercial forms of graphite and other graphene materials that may be used to fabricate the negative electrode 22 are available from, by way of non-limiting example, Timcal Graphite and Carbon of Bodio, Switzerland, Lonza Group of Basel, Switzerland, or Superior Graphite of Chicago, United States of America. Other materials can also be used to form the negative electrode 22, including, for example, lithium-silicon and silicon containing binary and ternary alloys and/or tin-containing alloys, such as Si-Sn, SiSnFe, SiSnAl, SiFeCo, $SnO_2$, and the like. In certain instances, lithium-titanium anode materials are contemplated, such as $Li_{4+x}Ti_5O_{12}$, where $0 \leq x \leq 3$, including lithium titanate ($Li_4Ti_5O_{12}$) (LTO). The negative electrode current collector 32 may be formed from copper (Cu) or any other appropriate electrically conductive material known to those of skill in the art.

In various aspects, the positive electrode 24, the negative electrode 22, and the separator 26 may each include an electrolyte solution or system 30, capable of conducting lithium ions between the negative electrode 22 and the positive electrode 24. In certain aspects, the electrolyte 30 may be a non-aqueous liquid electrolyte solution that includes one or more lithium salts dissolved in an organic solvent or a mixture of organic solvents. In certain variations, the electrolyte 30 may be a 1M solution of one or more lithium salts in one or more organic solvents. Numerous conventional non-aqueous liquid electrolyte 30 solutions may be employed in the lithium-ion battery 20. A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium trigluoromethanesulfonimide ($LiN(CF_3SO_2)_2$), lithium bis(fluorosulfonyl)imide ($LiN(FSO_2)_2$) (LiSFI), and combinations thereof. These and other similar lithium salts may be dissolved in a variety of organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), and combinations thereof.

In various aspects, the separator 26 may be a composite separator including an insulating porous substrate having at least one substantially uniform porous polymer coating, layer, or phase formed in accordance with various aspects of the present disclosure. The pores of the substantially uniform porous polymer coating may be distributed within the coating in a substantially uniformed manner or fashion. For example, the at least one substantially uniform porous polymer coating may have a porosity greater than or equal to about 20% to less than or equal to about 90%, optionally greater than or equal to about 30% to less than or equal to about 60%. The pores of the at least one substantially uniform porous polymer layer may have an average diameter of greater than or equal to about 50 nm to less than or equal to about 2 μm.

The insulating porous substrate may comprise a polymeric fiber, such as those selected from the group consisting of: polyethylene (PET) fibers, cellulose fibers, glass fibers, polyamide fibers, polyolefin fibers, and combinations thereof; or a porous polymer member, such as a polyethylene and polypropylene membranes. The insulating porous substrate has one or more exposed surface regions collectively defining an exposed surface area, for example, surface regions that are on a first side of the insulating porous substrate facing the positive electrode and/or a second side of the insulating porous substrate facing the negative electrode. The one or more exposed surface regions of the insulating porous substrate comprise external surfaces, including any exposed pores, and in certain variation, internal pore surfaces extending into the body of the insulating substrate. The one or more of the exposed surface regions of the insulating porous substrate may be treated in accordance with certain aspects of the present disclosure to have the at least one substantially uniform porous polymer layer or coating disposed thereon. In various instances, the at least one substantially uniform porous polymer layer has a thickness greater than or equal to about 1 μm to less than or equal to about 40 μm. The insulating porous substrate may have a thickness less than or equal to about 20 μm, and the composite separator may have an overall thickness of less than or equal to about 100 μm, optionally less than or equal to about 50 μm, and in certain aspects, optionally less than or equal to about 25 μm.

The at least one substantially uniform porous polymer coating includes one or more polymers having at least 200 repeating units. The one or more polymers may be selected from the group consisting of: aramid polymers, polyamide, polyvinylidene fluoride (PVdF), polysulfide, polyimide (PI), polyacrylic, polycarbonate, and combinations thereof. Optionally, in certain variations, the at least one substantially uniform porous polymer coating may also include particulate additives and/or ceramic particles. For example, in certain aspects, the at least one substantially uniform porous polymer coating may include one or more nanoparticles, for example, having an average diameter of less than about 100 nm; one or more sub-micron particles, for example, having an average diameter of greater than or equal to about 100 nm and less than or equal to about 2 μm; and combinations thereof. In certain aspects, the one or more nanoparticles and the one or more sub-micron particles may comprise materials independently selected from the group consisting of: alumina ($Al_2O_3$), silica ($SiO_2$), titanium dioxide ($TiO_2$), calcium chloride ($CaCl_2$), metal oxides, carboxides, nitrides (e.g., boron nitride (BN), sulfur nitride (SN)), titanates (e.g., barium titanate ($BaTiO_3$)), clays, phosphates, and combinations thereof. In certain variations, the one or more nanoparticles may aid in subsequent pore formation, and the one or more sub-micron particles may provide and/or improve the mechanical strength of the formed composite separator. For example, nanoparticles have comparatively high specific areas and may be effective in improving the conductivity of the electrolyte and, in certain instances, trapping contaminates within the electrolyte. The larger sizes of the sub-micron particles may physically block dendrite and other contaminates within the electrolyte and electrochemical cell.

In certain aspects, the present disclosure provides a method of forming such a thermally-stable composite separator. The method may include first forming a non-porous polymeric layer on one or more surface regions of an insulating substrate. Then, the one or more surface regions of the insulating substrate having the non-porous polymeric coating layer formed thereon may be contacted with a coagulant medium. In this manner, the contact with the coagulant medium causes the non-porous polymeric coating layer on the surface(s) of the insulating substrate to transform into a substantially uniform porous polymer coating, as will be described further below.

Prior to contact with the coagulant medium, the at least one non-porous polymeric layer includes the polymer; optionally, one or more particulate additives; and a first or primary solvent. The primary solvent may be selected from the group consisting of: dimethylformamide (DMF), dimethyl sulfoxide (DMSO), dimethylacetamide (DMAc), and combinations thereof. For example, in certain aspects, the first or primary solvent may be an N-methyl-2-pyrrolidone (NMP)-based solvent. In some variations, the primary solvent may include greater than or equal to about 2 wt. % to less than or equal to about 20 wt. % of calcium chloride ($CaCl_2$) dissolved in N-methyl-2-pyrrolidone (NMP); and optionally, the primary solvent may include greater than or equal to about 4 wt. % to less than or equal to about 12 wt. % of a solution of calcium chloride ($CaCl_2$) and lithium chloride (LiCl) dissolved in N-methyl-2-pyrrolidone (NMP). The calcium chloride ($CaCl_2$) and/or lithium chloride (LiCl) may be completely dissolved within the N-methyl-2-pyrrolidone (NMP). In various aspects, the calcium chloride ($CaCl_2$) and/or lithium chloride (LiCl) may improve solubility of the polymer.

A polymer coating solution may be used to form and/or apply the at least one non-porous polymeric layer. The polymer coating solution may include greater than or equal to about 3 wt. % to less than or equal to about 40 wt. % of the polymer. In certain instances, the polymer coating solution may further include less than or equal to about 400 wt. % of the one or more nanoparticles, and optionally, less than or equal to about 3000 wt. % of the one or more sub-micron particles.

In certain variations, the polymer coating solution has a viscosity greater than or equal to about 1 Pa·s and less than or equal to about 80 Pa·s, and in certain aspects, optionally greater than or equal to about 10 Pa·s and less than or equal to about 30 Pa·s, and the at least one non-porous polymeric layer of the coated substrate may be formed by applying the polymer coating solution via a deposition process to one or more surface regions of the insulating porous substrate. The polymer coating solution may be applied using a conventional deposition process, for example, using lamination processes or techniques, slot die coating processes or techniques, spray coating processes or techniques, blade coating processes or techniques, curtain coating processes or techniques, dip coating processes or techniques, and various vacuum coating processes or techniques. In various instances, a vacuum may be applied to a surface region of the insulating porous substrate on a side opposing the one or more surface regions where deposition is to occur to improve adhesion between the insulating porous substrate and the at least one non-porous polymeric layer.

In certain other variations, the polymer coating solution has a viscosity greater than or equal to about 0.1 Pa·s and less than or equal to about 20 Pa·s, and in certain aspects, optionally greater than or equal to about 0.1 Pa·s and less than or equal to about 10 Pa·s, and the at least one non-porous polymeric layer may be first disposed onto a conveying system and subsequently contacted with the insulating porous substrate to form the at least one non-porous polymeric layer on the insulating porous substrate. The coating sequence may limit air trapping and the consequential formation of undesirable air bubbles or pockets within the coated insulated porous substrate that may potentially result from the lower viscosity.

In various aspects, the polymer coating solution/at least one non-porous polymeric layer may further include a secondary solvent. The secondary solvent is volatile and may be used to vary the viscosity of the polymer coating solution/at least one non-porous polymeric layer. Thus, addition of a secondary solvent may influence the selected coating sequence and the formation of the coated substrate. After the at least one non-porous polymeric layer is formed on the one or more surfaces of the insulating porous substrate, the secondary solvent may be removed using evaporation techniques or processes. The secondary solvent may include tetrahydrofuran (THF), acetone, acetonitrile, and combinations thereof.

The formed coated substrate (the insulating porous substrate having the at least one non-porous polymeric layer formed thereon) is a wet structure. To form a porous composite separator therefrom, the coated substrate is contacted with a coagulant medium or bath. The coagulant medium has a viscosity (Pa·s) greater than that of the primary solvent of the polymer coating solution/at least one non-porous polymeric layer and a solubility parameter distance in relation to the polymer that is less than a solubility parameter distance between the polymer and water. For example, in certain aspects, the coagulant medium may have a viscosity that is greater than or equal to about 200%, and optionally, greater than or equal to about 1000%, that of the primary solvent; and the solubility parameter distance between the polymer and the coagulant may be less than or equal to half (50%) of the solubility parameter distance between the polymer and water. The coagulant medium may include materials selected from the group consisting of: ethylene glycol, glycerol, diethylene glycol, and combinations thereof. In certain instances, the coagulant medium may include materials selected from the group consisting of: diethylene glycol, glycerol, and combinations thereof.

The method may include contacting the one or more surface regions of the coated substrate having the at least one non-porous polymeric layer with the coagulant medium. In other instances, the coated substrate may be dipped into a coagulant medium. The method may include contacting the coated substrate with the coagulant medium for various durational periods. The coagulant medium washes the primary solvent from the at least one non-porous polymeric layer and thereby induces precipitation of the polymer onto the surface of insulating porous substrate and promotes formation of a porous layer or coating in place of the non-porous wet polymeric layer—at least one substantially uniform porous polymer layer or coating is thus formed in place of the at least one non-porous polymeric layer. In this fashion, formation of the substantially uniform porous morphology may occur in greater than or equal to about 2 seconds to less than or equal to about 1 minute, optionally greater than or equal to about 2 seconds to less than or equal to about 30 seconds, and in certain variations, optionally, greater than or equal to about 2 seconds to less than or equal to about 10 seconds.

In various instances, the method may further include washing the at least one substantially uniform porous polymer layer and the insulating porous substrate to remove residual primary solvent and coagulant. For example, in certain instances, the at least one substantially uniform porous polymer layer and the insulating porous substrate may be washed using distilled water. In still further variations, the method may also include drying the at least one substantially uniform porous polymer layer and the insulating porous substrate. In certain instances, the at least one substantially uniform porous polymer layer and the insulating porous substrate may be oven dried. The at least one substantially uniform porous polymer layer and the insulating porous substrate may be oven dried for various durations and at various temperatures, for example, the at least one substantially uniform porous polymer layer and the insulating porous substrate may be dried in an oven held at about 120° C. for around 2 hours.

Figure 2:
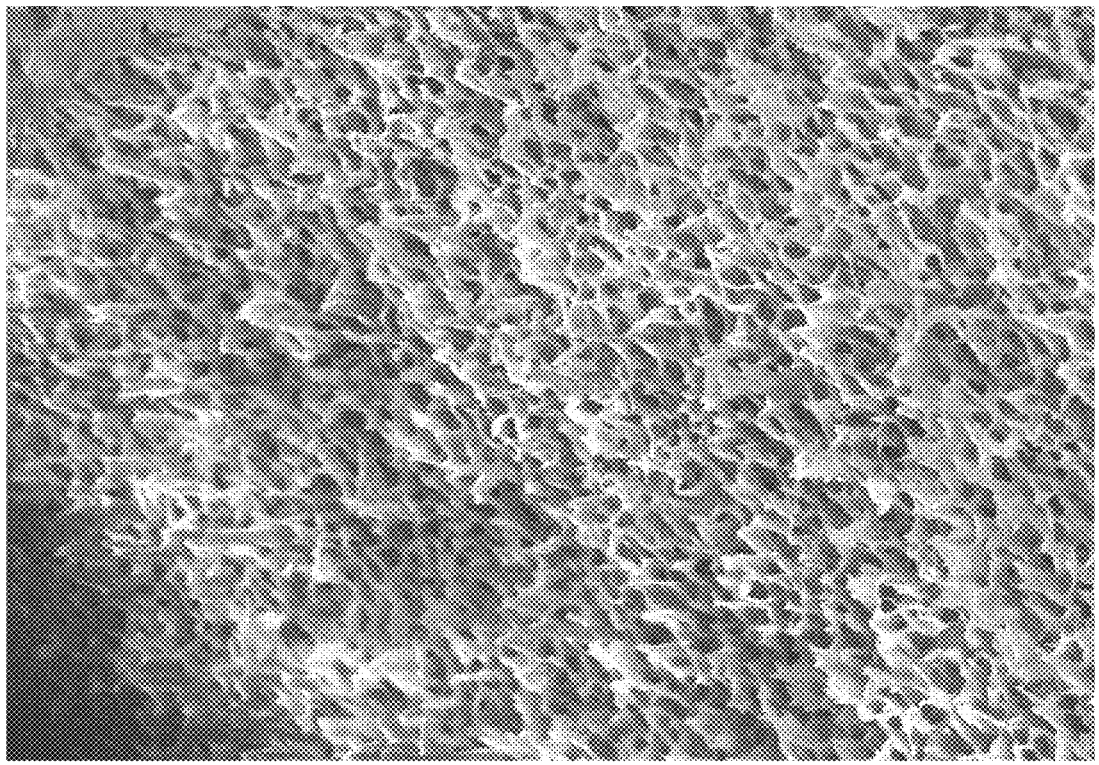
FIG. 2 is a micrograph showing a cross section of a composite separator made in accordance with certain aspects of the present disclosure.
Figure 3:
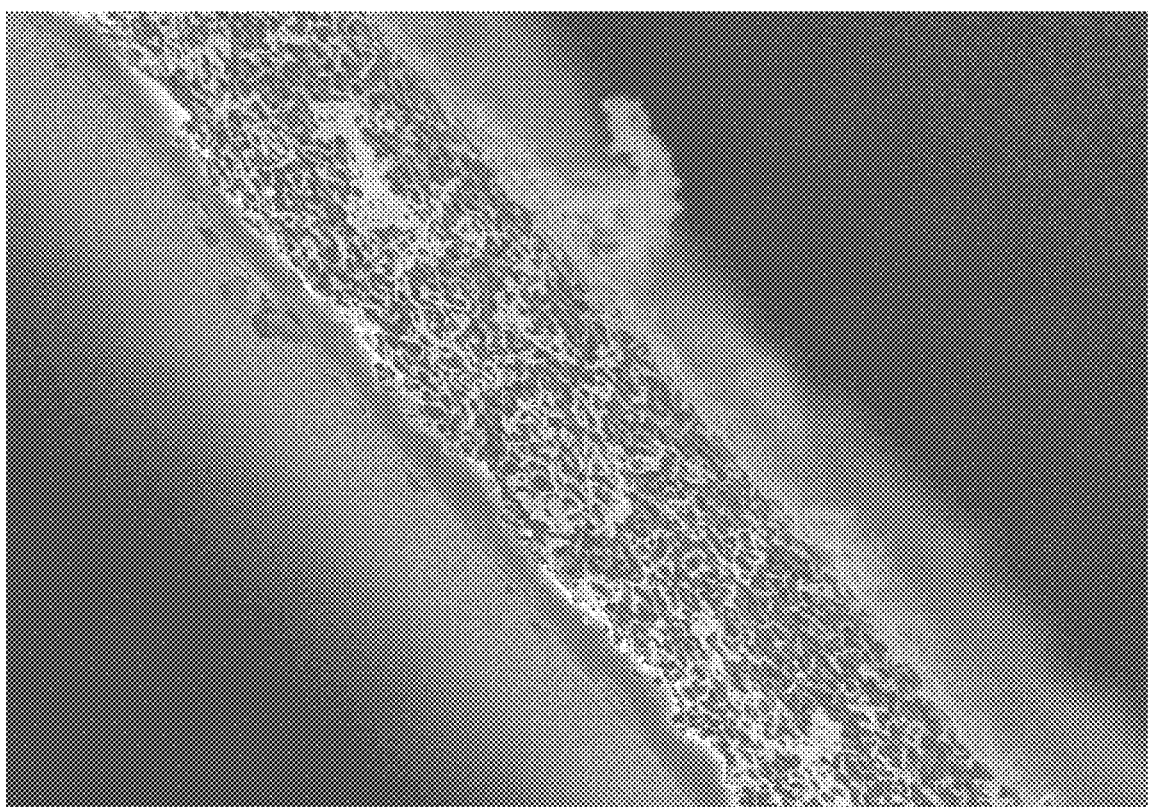
FIG. 3 is a micrograph showing a cross section of a composite separator made in accordance with certain aspects of the present disclosure.

In certain aspects, a portion of the coagulant medium enters the at least one non-porous polymeric layer during the precipitation process. The at least one non-porous polymeric layer and the insulating porous substrate are subsequently washed to remove residual primary solvent and coagulant and dried (e.g., oven-dried). During the drying process, the coagulant medium that entered the at least one non-porous polymeric layer evaporates or volatilizes forming substantially uniformed pores therein. In this fashion, the selected coagulant medium may control the morphology of the pores of the at least one substantially uniform porous polymer layer. For example, FIG. 2 is a micrograph showing a cross section of a composite separator made using a coagulant medium including ethylene glycol, and FIG. 3 is a micrograph showing a cross section of a composite separator made using a coagulant medium including glycerol.

Figure 4:
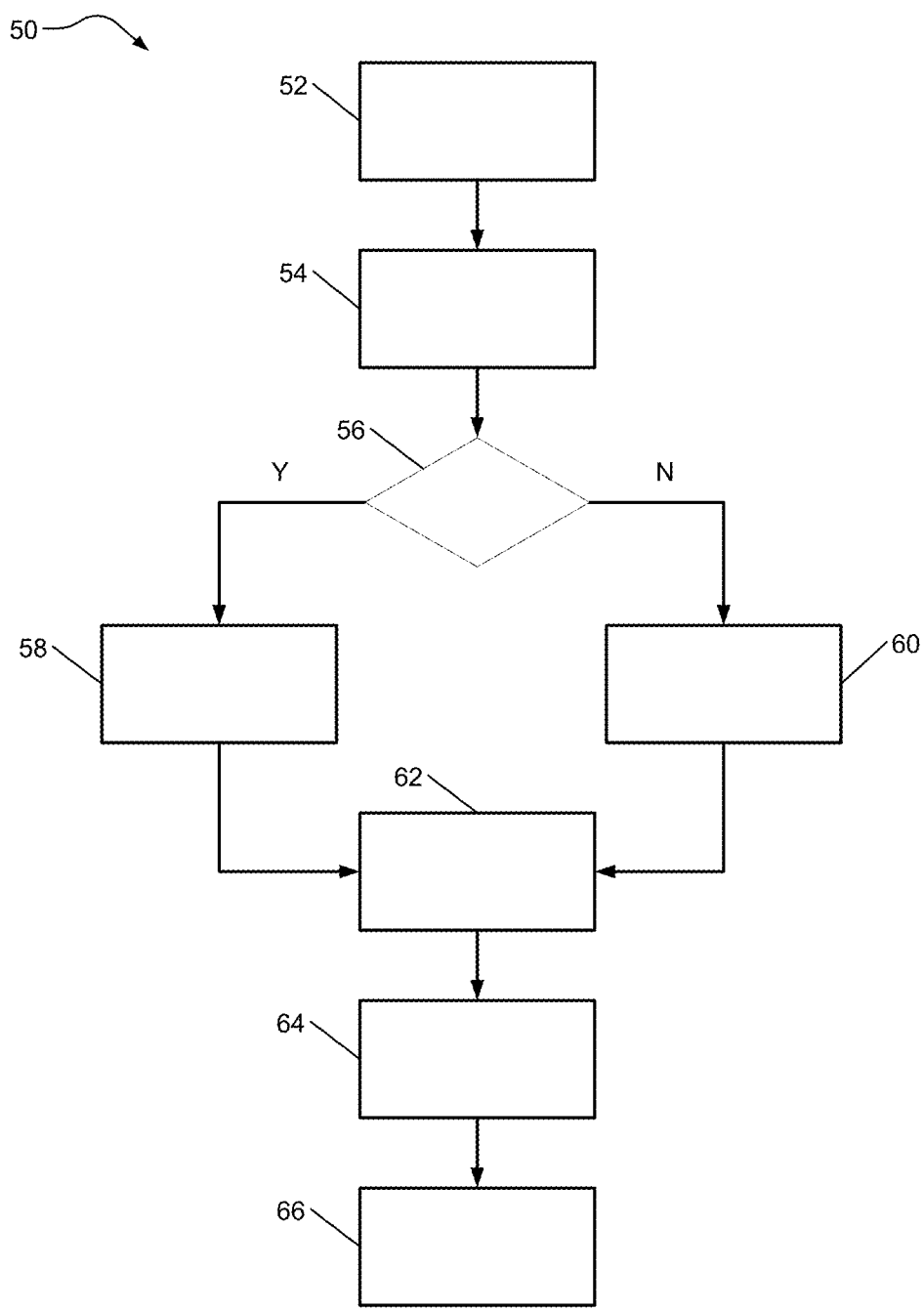
FIG. 4 is a flow chart illustrating an exemplary method of producing a thermally-stable composite separator for an electrochemical cell that cycles lithium ions in accordance with certain aspects of the present disclosure.

FIG. 4 is a flow chart that provides an exemplary method 50 of producing a thermally-stable composite separator for an electrochemical cell that cycles lithium ions. The method includes, at 52, preparing a polymer coating solution, and at 54, measuring the viscosity (Pa·s) of the prepared polymer coating solution. The viscosity (Pa·s) of the prepared polymer coating solution determines the coating sequence at 56. If the measured viscosity (Pa·s) is greater than or equal to about 1 Pa·s and less than or equal to about 80 Pa·s, and in certain aspects, optionally greater than or equal to about 10 Pa·s and less than or equal to about 80 Pa·s, the at least one non-porous polymeric layer of the coated substrate is formed by applying the polymer coating solution via a deposition process to one or more surface regions of the insulating porous substrate at 58. If the measured viscosity (Pa·s) is greater than or equal to about 0.1 Pa·s and less than or equal to about 20 Pa·s, and in certain aspects, optionally greater than or equal to about 0.1 Pa·s and less than or equal to about 10 Pa·s, the at least one non-porous polymeric layer is first disposed onto a conveying system and subsequently contacted with the insulating porous substrate to form the coated substrate at 60. At 62, one or more surface regions of the insulating porous substrate having the at least one non-porous polymeric layer on one or more surface regions then is contacted with a coagulant medium to create pores and form at least one substantially uniform porous polymer layer on one or more surfaces of an insulating porous substrate of the coated substrate, as detailed above. At 64, the at least one substantially uniform porous polymer layer disposed on one or more surfaces of the insulating porous substrate may be washed, and at 66, the at least one substantially uniform porous polymer layer disposed on one or more surfaces of the insulating porous substrate may be oven dried, as detailed above, to form the thermally-stable composite separator.

Embodiments of the present technology are illustrated through the following non-limiting example.

Example 1

A composite separator according to certain aspects of the present disclosure is prepared by first dissolving an amount of polyamide in an 8 wt. % solution of calcium chloride ($CaCl_2$) in N-methyl-2-pyrrolidone (NMP) to form a 10.5 wt. % polymer solution. Varying concentrations of alumina ($Al_2O_3$) nanoparticles and sub-micron particles are subsequently dispersed in the polymer solution to form a uniform dispersion. In particular, 20 wt. % of alumina ($Al_2O_3$)

nanoparticles and 200 wt. % of alumina ($Al_2O_3$) sub-micron particles are dispersed in the polymer solution. A coated substrate is then form by one of casting the dispersion onto a conveying system (e.g., conveyor belt) and subsequently contacting an insulating porous substrate with the casted dispersion, or applying the dispersion to one or more surface regions of the insulating porous substrate via a deposition process. One or more surface regions of the coated substrate are then contacted with a coagulant medium and eventually washed with distilled water to remove residual calcium chloride ($CaCl_2$), N-methyl-2-pyrrolidone (NMP), and coagulant materials and oven dried at 120° C. for 2 hours.

To characterize the formed composite separator, the composite separator is sandwiched between two stainless steel electrodes, which are saturated with a liquid electrolyte comprising 1M lithium hexafluorophosphate ($LiPF_6$) in a solvent comprising a 1:1 volume ratio of ethylene carbonate (EC) and dimethyl carbonate (DMC). The ionic conductivities ($\sigma$) of the electrochemical cell are calculated using the following equation:

$$\sigma = \frac{d}{R_b \cdot S}$$

where d is the thickness ($\mu m$) of the separator, $R_b$ is the bulk resistance obtained using an impedance gain analyzer, and S is the area of the negative and positive electrodes. The thermal shrinkage of the composite separator is measured at around 150° C. by comparing the size of the separator before and after heating. The following Table 1 compares the noted data of the formed composite separator with a conventional CELGARD® 2500 series separator, and as shown, the composite separator demonstrates improved thermal stability and ionic conductivity.

TABLE 1

|  | CELGARD ® 2500 | Composite Separator |
|---|---|---|
| $\sigma\left(\frac{mS}{cm}\right)$ | 1.47 | 1.58 |
| Thickness ($\mu m$) | 25 | 33 |
| Thermal Shrinkage | 45% | 0% |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a thermally-stable composite separator for an electrochemical cell that cycles lithium ions, the method comprising:
   contacting one or more coated surface regions of a porous insulating substrate with a coagulant medium, wherein the one or more coated surface regions have at least one non-porous polymeric layer that comprises a polymer, one or more particulate additives, and a solvent, wherein the contacting with the coagulant medium removes the solvent causing the polymer to precipitate forming at least one substantially uniform porous polymer layer on the one or more coated surface regions to form the thermally-stable composite separator, wherein the coagulant medium has a first viscosity (Pa·s) greater than a second viscosity of the solvent, and wherein a solubility parameter distance between the polymer and the coagulant medium is less than that between the polymer and water.

2. The method of claim 1, wherein the one or more particulate additives is selected from one or more nanoparticles having an average diameter of less than about 100 nm; one or more sub-micron particles having an average diameter of greater than or equal to about 100 nm and less than or equal to about 2 $\mu m$; and combinations thereof.

3. The method of claim 2, wherein the polymer includes at least 200 repeating units and is selected from the group consisting of: aramid fibers, polyamide, polyvinylidene fluoride (PVdF), polysulfide, polyimide (PI), polyacrylic, polycarbonate, and combinations thereof;
   wherein the one or more nanoparticles and the one or more sub-micron particles comprise materials independently selected from the group consisting of: alumina ($Al_2O_3$), silica ($SiO_2$), titanium dioxide ($TiO_2$), calcium chloride ($CaCl_2$), metal oxides, carboxides, nitrides, titanates, clays, phosphates, and combinations thereof; and
   wherein the solvent is selected from the group consisting of N-methyl-2-pyrrolidone (NMP), dimethylformamide (DMF), dimethyl sulfoxide (DMSO), dimethylacetamide (DMAc), and combinations thereof.

4. The method of claim 3, wherein the solvent includes greater than or equal to about 2 wt. % to less than or equal to about 20 wt. % of one or more of calcium chloride ($CaCl_2$) and lithium chloride (LiCl) dissolved in N-methyl-2-pyrrolidone (NMP).

5. The method of claim 1, wherein the at least one non-porous polymeric layer is formed using a polymer coating solution having a third viscosity greater than or equal to about 1 Pa·s and less than or equal to about 80 Pa·s, and wherein the at least one non-porous polymeric layer is formed by applying the polymer coating solution via a deposition process to the one or more surface regions of the porous insulating substrate.

6. The method of claim 1, wherein the at least one non-porous polymeric layer has a fourth viscosity greater than or equal to about 0.1 Pa·s and less than or equal to about 20 Pa·s, and wherein the coated surface regions of the porous insulated substrate are formed by first disposing the at least one non-porous polymeric layer onto a conveying system and subsequently contacting the insulating porous substrate with the at least one non-porous polymeric layer.

7. The method of claim 1, wherein the solvent is a primary solvent and the viscosity of a polymer coating solution used to form the at least one non-porous polymeric layer is varied by adding a secondary volatile solvent, and
   wherein the secondary volatile solvent is selected from the group consisting of: tetrahydrofuran (THF), acetone, acetonitrile, and combinations thereof.

8. The method of claim 1, wherein the insulating porous substrate is selected from the group consisting of: polyethylene (PET) fibers, cellulose fibers, glass fibers, polyolefin fibers, polyamide fibers, and combinations thereof.

9. The method of claim 1, wherein the insulating porous substrate is selected from the group consisting of: polyethylene porous membranes, polypropylene porous membranes, and combinations thereof.

10. The method of claim 1, wherein the coagulant medium comprises materials selected from the group consisting of: ethylene glycol, glycerol, diethylene glycol, and combinations thereof.

11. The method of claim 1, wherein the coagulant medium has a viscosity that is greater than or equal to about 200% that of the primary solvent; and
wherein the solubility parameter distance between the polymer and the coagulant medium is less than or equal to half of the solubility parameter distance between the polymer and water.

12. The method of claim 1, further comprising:
washing the thermally-stable composite separator to remove residual primary solvent and coagulant medium; and
drying the thermally-stable composite separator.

13. A method of forming a thermally-stable composite separator for an electrochemical cell that cycles lithium ions, the method comprising:
applying at least one non-porous polymeric layer via a deposition process to one or more surface regions of an insulating porous substrate, wherein the at least one non-porous polymeric layer comprises a polymer, one or more nanoparticles having an average diameter of less than about 100 nm, one or more sub-micron particles having an average diameter of greater than or equal to about 100 nm and less than or equal to about 2 μm, and a solvent having a viscosity greater than or equal to about 1 Pa·s and less than or equal to about 80 Pa·s; and
contacting the at least one non-porous polymeric layer with a coagulant medium, wherein the contacting with the coagulant medium removes the primary solvent causing the polymer to precipitate to form at least one substantially uniform porous polymer layer on the porous substrate in place of the at least one non-porous polymeric layer, wherein the coagulant medium has a viscosity that is greater than or equal to about 200% that of the primary solvent, and wherein a solubility parameter distance between the polymer and the coagulant is less than or equal to half of a solubility parameter distance between the polymer and the water.

14. The method of claim 13, wherein the polymer is selected from the group consisting of: aramid fibers, polyamide, polyvinylidene fluoride (PVdF), polysulfide, polyimide (PI), polyacrylic, polycarbonate, and combinations thereof;
the one or more nanoparticles and the one or more sub-micron particles comprise materials independently selected from the group consisting of: alumina ($Al_2O_3$), silica ($SiO_2$), titanium dioxide ($TiO_2$), calcium chloride ($CaCl_2$), metal oxides, carboxides, nitrides, titanates, clays, phosphates, and combinations thereof; and
the solvent is selected from the group consisting of N-methyl-2-pyrrolidone (NMP), dimethylformamide (DMF), dimethyl sulfoxide (DMSO), dimethylacetamide (DMAc), and combinations thereof.

15. The method of claim 13, wherein the coagulant is selected from the group consisting of: ethylene glycol, glycerol, diethylene glycol, and combinations thereof.

* * * * *